April 19, 1960
R. KOMPFNER
2,933,640
PULSE COINCIDENCE DETECTING TUBE
Filed April 30, 1958
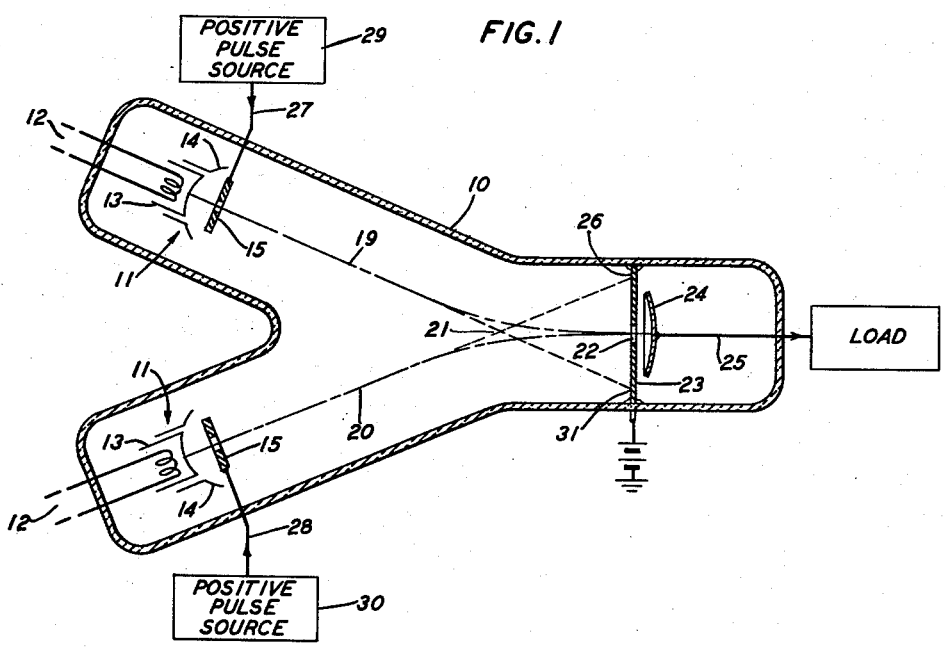
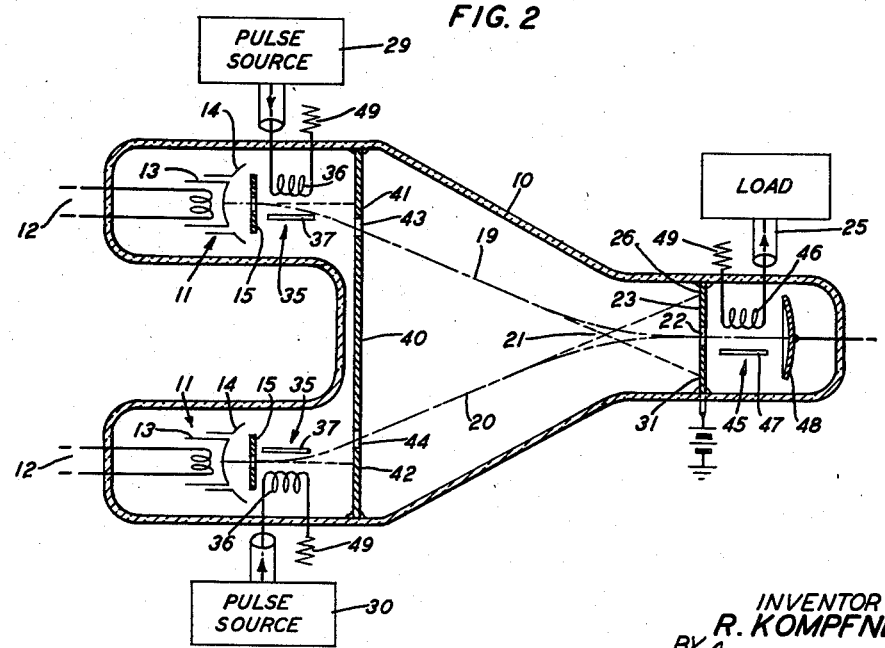
INVENTOR
R. KOMPFNER
BY
ATTORNEY United States Patent Office 2,933,640
Patented Apr. 19, 1960

2,933,640

PULSE COINCIDENCE DETECTING TUBE

Rudolf Kompfner, Holmdel, N.J., assignor to Bell Telephone Laboratories, Incorporated, New York, N.Y., a corporation of New York Application April 30, 1958, Serial No. 731,922

12 Claims. (Cl. 315—13)

This invention relates to electron discharge devices and more specifically to devices for detecting the presence or absence of coincident pulses.

Electronic devices for detecting the time coincidence or non-coincidence of pulses are used in computer systems, in various transmission line systems, and in certain phases of nuclear physics research. In all these areas, a device capable of producing an output signal in response to coincident input signals is desirable. Optimumly, such a device should be sensitive enough to detect coincidence of pulses of limited intensity and to signal such detection by a pulse of comparable length, timewise. Various types of devices have been used heretofore for such detection, but the great majority of these have utilized the non-linearity of diodes to accomplish their purposes and have, therefore, included the definite limitations as to both sensitivity and time resolution inherent in the diodes used. In the aforementioned areas these limitations often preclude the use of such a device for measuring pulse coincidence, since in these areas a much more sensitive device for accurately detecting and measuring the coincidence of pulses is necessary. However, in the past, efforts to provide rapid and accurate coincidence detection have resulted in complex structures and circuitry which are undesirable in themselves.

It is, therefore, an object of this invention to provide a pulse time coincidence detector having a high degree of sensitivity.

It is a further object of this invention to provide a pulse time coincidence detecting device which is both rapid and accurate in action.

It is a still further object of this invention to provide a device for detecting pulse time coincidence which is structurally simple and does not require extensive or complex circuitry.

The foregoing and other objects of this invention are accomplished in one specific illustrative embodiment by an electron discharge device utilizing the principle of space charge repulsion between two intersecting electron beams to deflect one or both beams through an aperture to impinge on detecting means. In any high intensity grouping of electrons there is a natural dispersion tendency resulting from the charge of the electrons themselves. When the electrons are quite closely grouped, an actual dispersion may take place because of the like negative charges, giving rise to space charge repulsive forces in the group, unless restraining means are provided to maintain the close grouping. This invention in this specific embodiment takes advantage of such a dispersive action by allowing high intensity electron groups in two or more beams to be directed by the deflecting action of space charge repulsion from an intersection of the beams to pass through an aperture. Thus, when electron groups above a certain intensity level simultaneously arrive at an intersection point, they will be deflected from their normal paths of travel to run along a new path.

In one specific illustrative embodiment of this invention, two intersecting electron beams are so directed with respect to an aperture that, when both beams are simultaneously intensity modulated by positive coincident pulses, they are deflected by mutual space charge repulsion at the point where intersection would normally take place and pass together through the aforementioned aperture to impinge on a target electrode therebehind. The intensities of the electron beams are such that unless bunching, i.e., intensity modulation, is present on both beams at the intersection point at the same instant, there will be no deflection of the beams such as to cause passage through the aperture and impingement on the target electrode and, as a consequence, no output signal indicating pulse coincidence.

In a second specific illustrative embodiment of this invention, two high intensity electron beams, which are normally directed parallel to each other, in the same direction, and collected by an aperture plate, are deflected by incoming signals on deflecting means to pass through apertures in that plate. In the region beyond the aperture plate the beams are, therefore, in the form of discrete pulses. If both beams are deflected through the apertures simultaneously, these pulses are directed to an intersection point where, by mutual space charge repulsion, they are further deflected to pass through another aperture plate and impinge on a collector means therebehind. It is apparent that if a pulse is present at the deflection means of only one beam, there is no intersection of the pulsed beams and no deflection through the final aperture to impinge on the collecting means. Utilizing the principle of space charge repulsion as in the aforementioned illustrative embodiments increases both the sensitivity and time resolution obtainable and allows the use of such a device where prior art devices are inoperable, or, at best, inefficient.

It is a feature of this invention that mutual space charge repulsion is employed to control the deflection of two electron beams, a detector being energized only when coincident pulses influence the beams to cause space charge repulsion.

It is a further feature of this invention that a pair of electron beams are projected so as to impinge on opposite sides of an aperture in an aperture plate but to pass through the aperture when both beams are simultaneously influenced by pulses. More specifically in accordance with this feature in the first illustrative embodiment positive pulses are applied to the electron beams, while in the second illustrative embodiment the beams are deflected by pulsed deflection means.

It is a still further feature of this invention in the first illustrative embodiment that grid means be utilized for pulsing electron beams and that electron gun means, a target electrode, and an aperture be so oriented that when coincident pulses modulate the electron beams, they pass through the aperture and impinge on the target electrode; but when the pulses are not coincident, the beams do not pass through the aperture.

It is a further feature of this invention in the second illustrative embodiment that deflecting means be so employed in conjunction with apertures to cause an intersection of electron beams when the deflecting means are pulsed by coincident pulses and that an aperture and detecting means thereafter be so aligned that the beams impinge upon the collector.

A complete understanding of this invention and these and other features thereof may be gained from consideration of the following detailed description and the accompanying drawing, in which:

Fig. 1 is a schematic view of an election discharge device illustrative of one specific embodiment of the invention; and Fig. 2 is a schematic view of an electron discharge device illustrative of another specific embodiment of the device.

Referring now to Fig. 1, there is depicted an electron discharge device having an envelope 10, two electron guns 11 comprising heaters 12 and cathodes 13, beam forming electrodes 14, and accelerating electrodes 15. Electron guns 11 may be any one of a number of types well known in the art, the pertinent requirements being that they preferably form flat sheet-like beams and that they be so aligned and positioned that an acute angle intersection of their respective beams 19 and 20 will take place at a point 21. An aperture plate 23 is positioned within the envelope 10 beyond the point of intersection of the beams. Plate 23 has an aperture 22 behind which is mounted a target electrode 24. Aperture plate 23, preferably a conductive member, is maintained at the steady-state potential of electrodes 15 and, as a consequence, neither focuses nor defocuses the beams 19 and 20. In a like manner, envelope 10 may be of conductive material, in which case it is preferably maintained at the potential of electrodes 15. Accelerating electrodes 15 are connected through lead-in conductors 27 and 28 to sources of positive pulses 29 and 30. It is to be understood that sources 29 and 30 may be any of a number of possible systems or devices, depending upon the particular application of the coincidence detector.

In operation electron guns 11 initiate beams 19 and 20 and direct them to intersect at point 21. The intensity of beams 19 and 20 is, without pulsing, below the level necessary to produce space charge repulsive forces of sufficient magnitude for deflection of the beams, thus beams 19 and 20 intersect at point 21 and are collected on aperture plate 23 at points 26 and 31. If either beam 19 or 20 is pulsed by positive pulse source 29 or 30, an electron bunch will be formed on that beam which travels toward the point of intersection 21; at the point of intersection 21 there will thus be a more intense grouping of electrons, though a grouping still below the necessary intensity for deflection of either beam through aperture 22. If both beams 19 and 20 are pulsed coincidentally, the intensity of the beams 19 and 20 at the intersection point 21 will be above the necessary level to produce deflection through space charge repulsion and they will both be deflected to travel toward and to pass through aperture 22. After passage through aperture 22 beams 19 and 20 impinge on target electrode 24 and give an output signal through a lead-in conductor 25 which is connected to any suitable load device, not shown.

From the foregoing, it can readily be seen that the device of Fig. 1 operates as an exceedingly rapid and reliable pulse coincidence detector, producing a useful output, with a minimum of structural and circuit complexity.

Referring now to Fig. 2, where members are numbered to correspond to like members of Fig. 1, there is depicted an electron discharge device having an envelope 10, two electron guns 11 comprising heaters 12, cathodes 13, beam forming electrodes 14, and accelerating electrodes 15, and deflecting means 35 comprising helices 36 and plates 37 which are connected to pulse sources 29 and 30 and which are terminated by suitable non-reflecting terminations 49.

It is to be understood that while the deflecting means here shown is similar in structure and operation to that disclosed in United States Patent 2,535,317 to J. R. Pierce, any suitable deflecting means of sufficient sensitivity and bandwidth may be used. Such a deflecting arrangement as here shown permits operation with very short duration pulses, inasmuch as the beam is under the influence of a pulse during the travel of the pulse down the length of the helix, and transit time of the beam is not an important factor, as it would be in the case of extremely short pulses and the more common lumped deflection systems. Electron guns 11 are so positioned and of such shape as to project preferably flat electron beams 19 and 20 in parallel planes and in the same direction to impinge on points 41 and 42 of an aperture plate 40 which is maintained at a suitable potential by a source, not shown, for collecting the impinging electrons. Deflecting means 35 are so arranged that when a pulse from either source 29 or 30 is applied to the corresponding deflecting means, the corresponding beam is deflected to pass through either aperture 43 or 44 in plate 40. Inasmuch as the beam passes through the aperture only during the period that a pulse is present on the deflecting means, the net effect is to produce a pulsed beam in the region beyond the plate 40. If only one of the beams 19 or 20 has been deflected, it passes through aperture 43 or 44 to impinge on an aperture plate 23 at point 26 or 31 where it will be collected, aperture plate 23 being maintained at a suitable potential by means, not shown, for collecting the impinging electrons. If both beams 19 and 20 have been deflected coincidentally, they will both pass through the apertures in plate 40 and be directed toward a point of intersection 21 between plates 40 and 23. The intensity of beams 19 and 20 in this embodiment is such that there will be deflection from any intersection due to space charge repulsion; their combined intensity is at all times above the threshold intensity necessary for such deflection. Accordingly, when both beams are deflected simultaneously, as they approach the point of intersection 21, the space charge repulsion forces act to deflect the beams, as indicated in Fig. 2, to pass through aperture 22 in plate 23. The beams are then detected by a suitable detecting arrangement 45 which may comprise, for example, a helix 46, a plate 47, and a collector 48. Helix 46, in which a signal is induced, is connected through suitable means 25 to the load device, not shown, and is terminated by a suitable non-reflecting termination 49.

It can be seen from the foregoing that the device of Fig. 2 requires only that the pulses applied thereto be of sufficient intensity to deflect the beams. Under circumstances where the actuating pulses are relatively weak, proper operation is obtainable by correct choice of deflecting means or the degree of deflection necessary to produce intersecting beams.

While the invention has been disclosed in embodiments utilizing two electron beams, it is readily apparent that several beams might be used in either embodiment. In addition, the device might readily be arranged to detect only one pulse, rather than time coincidence of pulses, or adapted to detect and produce an output signal when there is non-coincidence of pulses, and no output signal when there is pulse coincidence. The beams themselves have been shown as flat or sheet beams. However, other beam configurations might readily be used.

It is to be understood that the above-described arrangements are illustrative of the application of the principles of this invention only. Numerous other arrangements may be devised by those skilled in the art without departing from the spirit and scope of the invention.

What is claimed is:

1. An electron discharge device for the detection of the time coincidence of electrical pulses comprising means for projecting a first pulsed electron beam along a first path, means for projecting a second pulsed electron beam along a second path intersecting said first path at an acute angle, each of said means comprising means for applying pulses to the corresponding electron beam, and means for detecting deflection of said beams from said first and second paths when pulses on said beams appear simultaneously at the point of intersection of said beams.

2. An electron discharge device in accordance with claim 1 wherein said pulse means comprises means for increasing the electron beam intensity at distinct points along said beams.

3. An electron discharge device in accordance with claim 1 wherein said pulse means comprises means for normally preventing passage of said beams along said paths and means for disabling said preventing means to allow passage of discrete beam pulses along said paths.

4. An electron discharge device in accordance with claim 1 wherein said detecting means comprises a plate having an aperture therein and means for detecting passage of said beams through said aperture after deflection of said beams from said first and second paths.

5. An electron dischrage device for detecting the time coincidence of pulses comprising an aperture plate, means for projecting a first pulsed electron beam against said plate to one side of said aperture, means for projecting a second pulsed electron beam against said plate to the other side of said aperture, the normal path of said second pulsed beam intersecting the normal path of said first pulsed beam at an acute angle, each of said means comprising means for applying pulses to the corresponding beams, the simultaneous presence of pulses on said beams at the point of intersection of said paths deflecting said beams by mutual space charge repulsion to pass through said aperture, and means for detecting passage of said deflected beams through said aperture which means are positioned on the opposite side of said plate than the side upon which said projecting means are positioned.

6. An electron discharge device in accordance with claim 5 wherein said means for applying pulses comprises a control electrode for each of said beams and means for applying positive potential pulses to said control electrodes.

7. An electron discharge device in accordance with claim 5 wherein said means for applying pulses comprises a second plate having slots therein, deflection means, and means for applying pulses to said deflection means to direct said beams through said slots in discrete pulses.

8. An electron discharge device for detecting time coincidence of electrical pulses comprising means for forming and projecting a first electron beam along a first path, means for forming and projecting a second electron beam along a second path, an apertured plate positioned in target relationship with said electron beams, means for altering the path of said first and second electron beams to direct each of them through an aperture in said plate, said last-mentioned means comprising first and second pulse sources and means for applying the pulses to said beams, and means positioned beyond said apertured plate for collecting the electrons in the two beams when said beams have been simultaneously influenced by pulses from said sources.

9. An electron discharge device in accordance with claim 8 wherein said means for applying pulses to said beams comprises means for intensity modulating said beams.

10. An electron discharge device in accordance with claim 8 wherein said means for applying pulses to said beams comprises means for deflecting said beams from their initial path of travel.

11. An electron discharge device for the detection of the time relationship of electrical pulses comprising means for projecting a first pulsed electron beam along a first path, means for projecting a second pulsed electron beam along a second path intersecting said first path at an acute angle, first collector means for collecting said pulsed electron beams projected along said first and second paths, and second collector means for collecting said pulsed electron beams after deflection of said beams from said first and second paths when pulses on said beams appear simultaneously at the point of intersection of said beams.

12. An electron discharge device for detecting the time relationship of electrical pulses comprising means for forming and projecting a first electron beam along a first path, means for forming and projecting a second electron beam along a second path, means for altering the paths of said electron beams, said last-mentioned means comprising first and second pulse sources and means for applying pulses to said beams, first collector means for collecting said electron beams projected along said first and second paths, and second collector means for collecting said pulsed electron beams when altered from said first and second paths by the simultaneous influence of pulses from said sources.

References Cited in the file of this patent

UNITED STATES PATENTS

| | | |
|---|---|---|
| 2,229,752 | Jonker | Jan. 28, 1941 |

FOREIGN PATENTS

| | | |
|---|---|---|
| 558,143 | Great Britain | Dec. 23, 1943 |